(12) United States Patent
Kim

(10) Patent No.: US 7,982,824 B2
(45) Date of Patent: Jul. 19, 2011

(54) LIQUID CRYSTAL DISPLAY DEVICE

(75) Inventor: Jong-Hyeok Kim, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 220 days.

(21) Appl. No.: 12/399,434

(22) Filed: Mar. 6, 2009

(65) Prior Publication Data
US 2009/0225256 A1 Sep. 10, 2009

(30) Foreign Application Priority Data
Mar. 7, 2008 (KR) .................. 10-2008-0021634

(51) Int. Cl.
*G02F 1/1335* (2006.01)
(52) U.S. Cl. ............................. 349/64; 349/62; 349/65
(58) Field of Classification Search ................. None
See application file for complete search history.

(56) References Cited

U.S. PATENT DOCUMENTS
6,100,952 A * 8/2000 Marvin et al. .................. 349/62
2007/0242184 A1* 10/2007 Ohta et al. ...................... 349/64

FOREIGN PATENT DOCUMENTS
JP  2003-222861  8/2003

\* cited by examiner

*Primary Examiner* — Tina M Wong
(74) *Attorney, Agent, or Firm* — Morgan, Lewis & Bockius LLP

(57) ABSTRACT

Disclosed is a liquid crystal display device including an optical member with a region using an optical component such as a light emitting diode (LED) used as a backlight source, namely, a light characteristics changing layer for changing a spectrum distribution and chromaticity coordinates of light emitted from a back light. The LCD device including: a liquid crystal panel that displays an image; a backlight unit provided on a rear surface of the liquid crystal panel and providing light; and an optical member provided between the liquid crystal panel and the backlight unit and having a light characteristics changing layer for changing a spectrum distribution of light outputted from the backlight unit and chromaticity coordinates and providing the same to the liquid crystal panel.

10 Claims, 5 Drawing Sheets

LIQUID CRYSTAL DISPLAY DEVICE

BACKGROUND OF THE INVENTION

1. Field of the Invention

The present invention relates to a liquid crystal display device and, more particularly, to a liquid crystal display device including an optical member with a region using an optical component such as a light emitting diode (LED) used as a backlight source, namely, a light characteristics changing layer for changing a spectrum distribution and chromaticity coordinates of light emitted from a back light.

2. Description of the Related Art

In general, the liquid crystal display (LCD) is a typical flat display device displaying images by adjusting the transmittance of light such that it corresponds to an image signal. Because the LCD is not a self-emission element that emits light by itself, it needs a light source for providing light from a rear side of a liquid crystal display screen to visually display images.

A power source circuit for driving a light source including a lamp to emit light to a front liquid crystal panel from the rear side of a liquid crystal module (LCM) and an integral adjunct complex making planar light are called a backlight unit. According to a light emission method, the backlight unit is divided into two types: direct type backlight unit and an edge type backlight unit, and recently, the direct type backlight unit employing a surface light source such as an LED and the edge type flat backlight are also under study variably.

Here, as for the edge type backlight unit, its light source is positioned at the side of the LCD module, and light emitting from the light source is formed through a light guide plate. Such type of backlight can hardly avoid a phenomenon that luminance is generally degraded. Thus, in order to obtain uniformly distributed luminance, a more effective light guiding system, namely, a system for guiding light to a relatively far distance from the light source, is required, and an advanced optical technology is required to minimize a loss of light when light transmits from the light source to the relatively far distance.

FIG. 1 is an exploded perspective view of the related art edge-type LCD backlight unit, FIG. 2 is a sectional view of a general direct type LED LCD, and FIG. 3 illustrates a color region of an LED for a conventional LCD product.

As shown in FIG. 1, the edge type LED backlight unit includes a light source unit 10 providing light, a light guide plate 32 guiding light provided from the light source unit 10, and a diffusion sheet 34, a prism sheet 55, and the like, improving the optical characteristics of light outputted after transmitting the light guide plate 32.

Here, the light source unit 10 includes a substrate 12 and a plurality of LEDs 14. At this time, the LEDs 14 are mounted in a row on the substrate 12 and electrically connected with an external power source. The substrate with the plurality of LEDs 14 mounted thereon is inserted and fixed in a light source cover 16. A coupling groove 16a is formed along a longer axis direction of the light source cover 16 on an inner surface of the light source cover 16, and the substrate 12 is inserted in the coupling groove 16a so as to be fixed.

The light guide plate 32 guides light provided from the LED 14 of the light source unit 10 such that light is distributed to the entire upper surface of the light guide plate 32. A reflection plate 30 disposed below the light guide plate 32 increases light reflection efficiency.

The diffusion sheet 34 is disposed on the light guide plate 32 and uniformly distributes light that has transmitted through the light guide plate 32.

prism sheet 55 including first and second prism sheets 52 and 54 is disposed on the diffusion sheet 34. The prism sheet 55 guides light from the diffusion sheet 34 to a certain region, namely, to an image region, of a liquid crystal panel (not shown) on which images are displayed.

A protection sheet 56 may be disposed on the prism sheet 55 to protect the prism sheet 55 against an external scratch or the like.

The LCD device having the LED backlight unit needs a surface light source to implement image on its screen, and substantially, light of a dot light source form outputted from the LED package 14 is changed into a surface light source while passing through the light guide plate 32.

Meanwhile, the direct type backlight used for a large-scale liquid crystal display reflects light, which is outputted from a cold cathode fluorescent lamp (CCFL), from the reflection plate to the front liquid crystal panel. A milk-white scattering plate is disposed at a reflection path of the light to allow light of uniform illuminance (intensity of illumination) to be illuminated to the liquid crystal display. However, this method has a problem in that it makes the liquid crystal display an increased size due to the thickness of the backlight.

Recently, the backlight is made thinner and has an improved luminance by employing the LED, which is a two-pole element emitted only when current passes therethrough and has the characteristics of a fast response speed, low power consumption, semi-permanent light span, and the like, as a surface light source device. Above all, upon recognition that the LED can reproduce a natural color and high quality image compared with the conventional CCFL, solves the problem of a residual image of video, and environmentally friendly by not using mercury, the LED is good enough as a core component of the next-generation LCD that can replace the CCFL backlight unit.

With reference to FIG. 2, in the direct type LCD, based on a main support 70 formed as a mold product made of a synthetic resin or stainless steel and having a substantially rectangular frame shape, a backlight unit (not shown) on a lower cover 60 is mounted on a lower portion of the main support and a liquid crystal panel 90 is mounted on an upper portion of the main support, which are then fastened. An upper cover 99 fixing all the elements is assembled and fastened to the main support 70 and the lower cover 60, such that it covers the edges of the front surface of the liquid crystal panel 90.

First, direct type LED backlight providing light to the liquid crystal panel 90 includes an LED array including LEDs 66 mounted on the lower cover 60 and formed as at least one line to emit light, a plurality of printed circuit boards (PCBs) 64 with the LED array provided on its front surface and lighting the LED array by being driven up and down, a reflection plate 62 formed on a lower front surface of the region where the PCBs 64 are driven, a diffusion plate 82 provided at an upper portion of the LED array and reducing non-uniformity of light generated from the LED array, a prism sheet 84 provided on the diffusion plate 82, and a protection sheet 86 protecting the prism sheet 84 and increasing a viewing angle.

When the backlight unit completed, the main support 70 having the substantially rectangular frame shape and formed of the mold product of a synthetic resin or stainless steel is fastened, and then, the liquid crystal panel 90 is mounted thereon. Here, the liquid crystal panel 90 is fabricated by attaching a thin film transistor array substrate and a color filter substrate with liquid crystal injected therebetween.

For example, in generating white light by mixing a blue chip providing light of blue wavelength and yellow phosphor excited by the light provided from the blue chip in order to provide white light from the backlight unit of the edge type or the direct type LCD device, as shown in FIG. 3, only a portion of the entire color available range of the LED manufactured for the LCD device is limited in producing the LEDs due to the chrominance coordinates standards and the like. In this case, an LED out of the available range of the plurality of LEDs is inevitably produced, so handling of such LED out of the available range causes an increase in the LED unit cost.

In other words, in order to adjust color viewing sensation to a desired level while satisfying chromaticity coordinates, the LED out of the available range should come within the available region, for which, in the related art, various changes are sought in relation to color filters or the like, which, however, is not easy.

Namely, various types of color filters have been developed and manufactured correspondingly one by one according to the chromaticity coordinates region of the LED, incurring considerable costs for the color filter investment and development.

SUMMARY OF THE INVENTION

Therefore, in order to address the above matters, the various features described herein have been conceived. One aspect of the exemplary embodiments is to provide a liquid crystal display (LCD) device having an optical member with a light characteristics changing layer for changing a spectrum distribution of light outputted from a light source of a backlight and chromaticity coordinates.

This provides an LCD device including: a liquid crystal panel that displays an image; a backlight unit provided on a rear surface of the liquid crystal panel and providing light; and an optical member provided between the liquid crystal panel and the backlight unit and having a light characteristics changing layer for changing a spectrum distribution of light outputted from the backlight unit and chromaticity coordinates and providing the same to the liquid crystal panel.

This also provides an LCD device including: a liquid crystal panel that displays an image; a backlight unit provided on a rear surface of the liquid crystal panel and providing light; and an optical member provided between the liquid crystal panel and the backlight unit, including a diffusion plate, an optical sheet, and a reflection plate, and having a light characteristics changing layer for changing a spectrum distribution of light outputted from the backlight unit and chromaticity coordinates and providing the same to the liquid crystal panel.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5b is a graph of a spectrum distribution of a 500 nm~620 nm wavelength range of FIG. 5a;

DETAILED DESCRIPTION OF THE INVENTION

Exemplary embodiments of the present invention will now be described with reference to the accompanying drawings.

Figure 1:
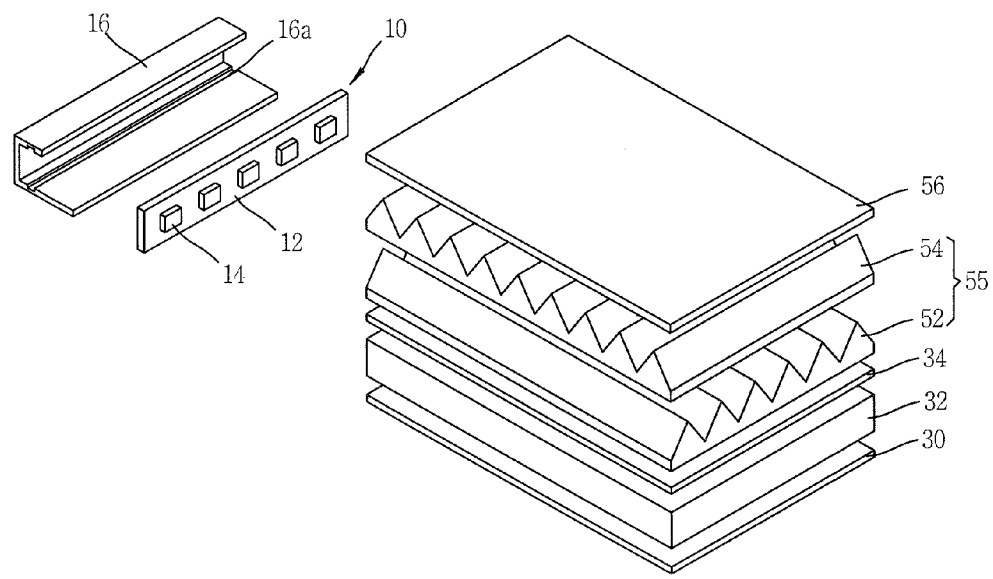
FIG. 1 is an exploded perspective view of an edge type LED backlight unit according to the related art.
Figure 2:
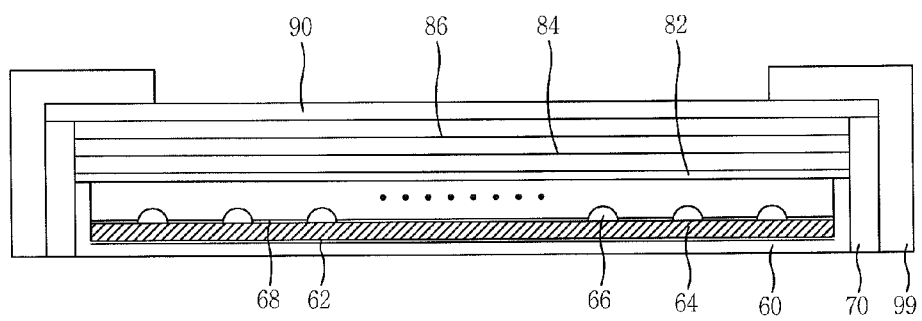
FIG. 2 is a sectional view of a general direct type LED LCD device.
Figure 3:
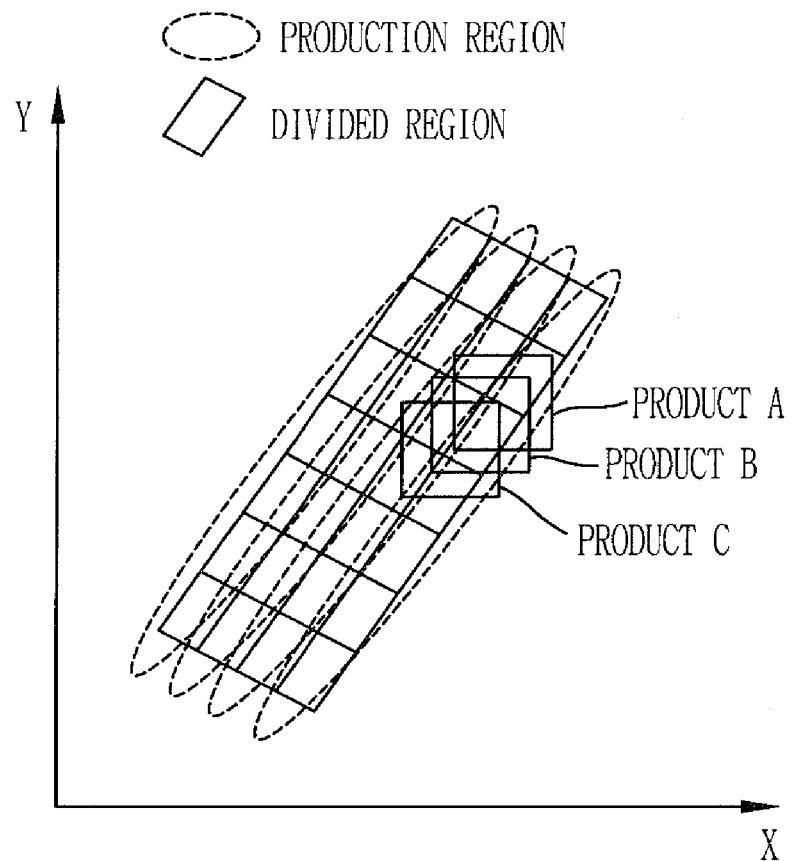
FIG. 3 is a graph showing a color region of an LED for a conventional LCD product.
Figure 4:
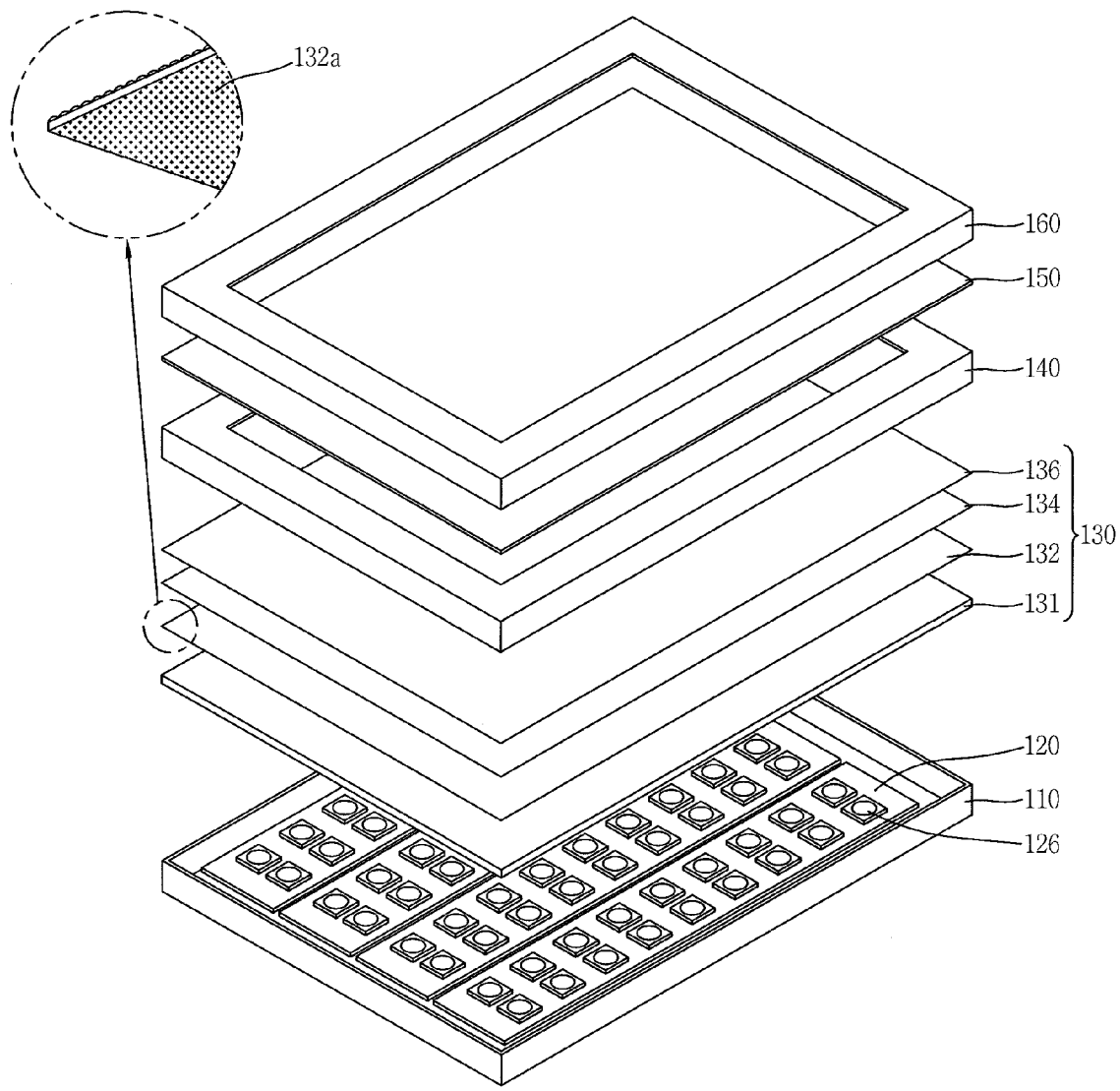
FIG. 4 is an exploded perspective view of a direct type LED LCD device according to an embodiment of the present invention.

FIG. 4 is an exploded perspective view of a direct type LED LCD device according to an embodiment of the present invention.

As shown in FIG. 4, the LCD device according to the present invention includes a backlight unit provided on a lower cover 110 to provide light and including at least one light emission unit configured as an LED package 126; a liquid crystal panel 150 separately provided at an upper side (or front surface) of the backlight unit and displaying an image upon receiving light from the backlight unit; and an optical member 130 provided between the backlight unit and the liquid crystal panel 150 and having a light characteristics changing layer 132a for changing optical characteristics such as a spectrum distribution of light outputted from the light emission unit and chromaticity coordinates characteristics.

First, the direct type LED backlight unit is provided on the lower cover 110 to provide light to the liquid crystal panel 150. A first reflection plate (not shown) is attached on the lower cover 110 to cover the entire surface of the lower cover. Here, the first reflection plate may be a film with silver (Ag) or aluminum (Al) coated thereon and having a thickness of about 75 µm to 200 µm. In general, light reflexibility of visible light on the first reflection plate is about 90% to 97%, and as the coated film becomes thicker, the reflexibility increases.

A plurality of PCBs 120 are arranged at regular intervals on the lower cover 110 with the first reflection plate (not shown) attached thereon, and for example, the PCB 120 according to the present invention may be a metal PCB configured as a sort of metal bar. Of course, a conductive wiring is formed on the metal PCB to enable the LED packages 126 to be driven by voltage applied from the exterior, and a metal material is formed on a rear surface of the metal PCB to facilitate releasing of heat of high temperature generated in relation to the LEDs.

The plurality of LED packages 126 are fixed in rows on the PCB 120 as light emission units providing light to the liquid crystal panel 150. LED packages 126 constituting a first row and those constituting a second row, i.e., four neighboring LED packages 126 in first and second rows, fixed on the PCB 120 may form a square shape. The LED package 126 includes a blue chip providing light of blue wavelength range and yellow phosphor excited by light provided from the blue chip to emit white light.

A second reflection plate (not shown) exposing the plurality of LED packages 126 is attached on the plurality of PCBs 120 the lower cover 110. Unlike the first reflection plate, the second reflection plate may be different in size as it is attached to each PCB 120, but a film coated with silver (Ag), aluminum (Al), and the like, thereon may be formed as the second reflection plate like the first reflection plate and may have a thickness of about 75 µm to 200 µm. A light reflexibility of visible light on the second reflection plate is about 90% to 97%, and as the coated film is thicker, its reflexibility increases.

The optical member 130, which includes a diffusion plate 131 and a diffusion sheet 132 for reducing non-uniformity of light emitted from the LED packages 126, a prism sheet 134 for increasing luminance of light which has transmitted through the diffusion plate 131 and the diffusion sheet 132, and a protection sheet 136 for protecting the prism sheet 134 and increasing a viewing angle, is provided at an upper side of the plurality of PCBs 120 with the LED packages 126 formed in a plurality of rows.

In the present invention, the light characteristics changing layer 132a is formed on the rear surface of the diffusion sheet 132 as one element of the optical member 130. The light characteristics changing layer 132a is a layer formed by coating a dye or pigment of at least one color among various dyes and/or pigments of yellow, blue, orange, green, red, and the like, on the rear surface of the diffusion sheet 132. The light characteristics changing layer 132a changes, namely, shifts, a color region of LED out of a particular region such as chromaticity coordinates standards or the like, among the overall color regions provided by the LED packages 126 constituting the backlight unit, into the chromaticity coordinates standards range, to thereby improve an overall color viewing sensation of the LCD device.

Here, the dyes generally include colorants such as textiles, but may refer, in a narrow meaning, to a colored material dissolved in water or oil so as to be distributed as single molecules so as to be combined with molecules such as filters to color them. In addition, the pigment is a powder colorant that is not dissolved in water or most organic solvents. The pigment is has a white color or other color, and may be mixed in a vehicle such as flaxseed oil, varnish, a synthetic resin solution, Arabic rubber, and the like to product pigment, print ink or the like so as to be put on the surface of an object or may be directly mixed with rubber or synthetic resin for coloring. Besides, it is also used to color enamel, toilet articles, and recently, to color a synthetic fiber material. The pigment is used for various purposes.

Among them, in the present invention, metal complex dyes may be suitable as the light characteristics changing layer 132a. The metal complex dye is a dye which is already a metal complex in a dye fabrication process, and in general, the metal complex dyes do not include such dyes that becomes metal complex in the process of dyeing process like a mordant dye, an acid mordant dye or some direct dyes. Generally, it has one structure among 0,0'-dihydroxyizo, 0-hydrixy-0'-aminoazo, and 0-hydroxy-0'-carboxyazo structure. As a metal ion, chromium (III), copper (II), nickel (II), cobalt (III) and the like may be used.

The metal complex dyes divided into 1:1 type dye (neolan dye, palatin fast dye) and a 2:1 type irgalan dye, cibalan dye) according to a combination ratio of dye molecules and metal ions. 1:1 type dye requires a considerably strong acid bath to obtain level dying, disadvantageously weakening fibers. 2:1 type dye improves such shortcomings of the 1:1 type dye, and it can be dyed in sub-acid path to neutral bath.

This type of dye is obtained with fusibility at a ratio of dye molecules and chromium of 2:1 (dye has negative charges) and does not contain a dissociable group such as a sulfonic acid group or the like. If the dye molecules are large, they may contain hydrophilic group of about sulfonic amid group.

The light characteristics changing layer 132a formed on at least one surface of the diffusion sheet 132 of the optical member 130 may be formed by coating a dye or pigment of at least one color among yellow, blue, orange dyes and/or pigments or the like entirely or partially on one surface of a base film made of polyethylene material through a separate fabrication process.

The coated dye and/or pigment may form the light characteristics changing layer 132a through heat or UV curing, and in this case, a general color viewing sensation of the LCD device may vary according to the density of the yellow, blue or orange dye or pigment. Thus, in order to allow output light of the LCD device to have a desired spectrum distribution, adjusting a desired type of dye or pigment and a desired amount of dye and pigment and adding the same to a prepared coating liquid is importantly considered.

The light characteristics changing layer 132a formed by coating such yellow, blue, orange dye and/or pigment serves as a sort of filter. In other words, as for light provided from the backlight, light of a particular wavelength range transmits through the light characteristics changing layer 132a while light of the other remaining wavelength range is shifted to be provided to the liquid crystal panel 150. In this case, the meaning of 'shifted' is based on the spectrum distribution when the light characteristics changing layer 132a is not formed on the diffusion sheet 132.

The main support 140 is provided to maintain the balance of overall power of the LCD device. The main support 140, a mold product of a synthetic resin or SUS steel having a substantially rectangular frame shape, has a certain pattern to allow the liquid crystal panel 150 to be loaded thereon and fastened surrounding the outer edges of the lower cover 110.

The liquid crystal panel 150 is mounted on the main support 140 to implement data information from the exterior upon receiving light from the lower backlight. Of course, the liquid crystal panel 150 includes a thin film transistor (TFT) array substrate with TFTs, switching elements, arranged at each unit pixel, a color filter substrate with color filters representing color formed thereon correspondingly, and liquid crystal injected between the two substrates.

The upper cover 160 is assembly and fastened to the main support 140 and the lower cover 110 such that it covers the four edges of the liquid crystal panel 150.

Hereinafter, the spectrum distributions of the LED LCD device according to pigments (or dyes) of various colors will be simply generalized.

The results below may slightly vary depending on a model specification of the LCD device, an LED product specification, and the density of dye and pigment formed on the optical member as mentioned above, namely, a content ratio of the dyes and pigments of various colors, or the like, and those would not basically depart from the technical idea of the present invention.

Figure 5A:
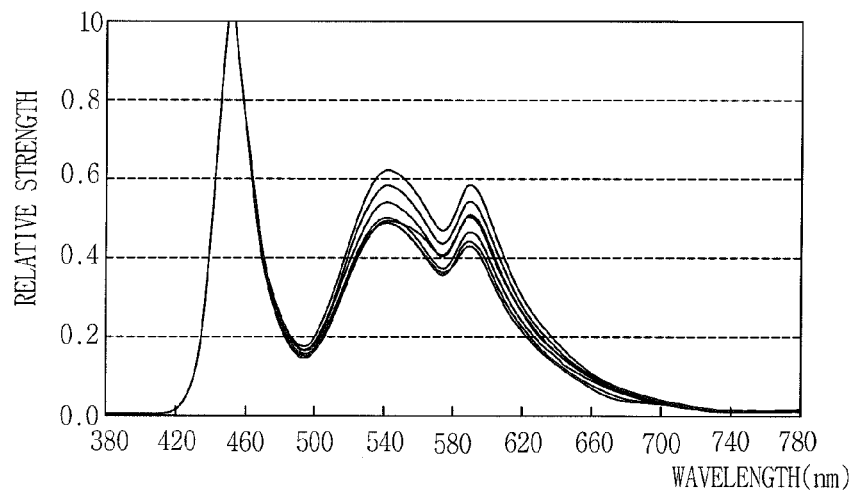
FIG. 5a is a graph of a spectrum distribution of a visible light wavelength region of the LCD device of FIG. 4.
Figure 5B:
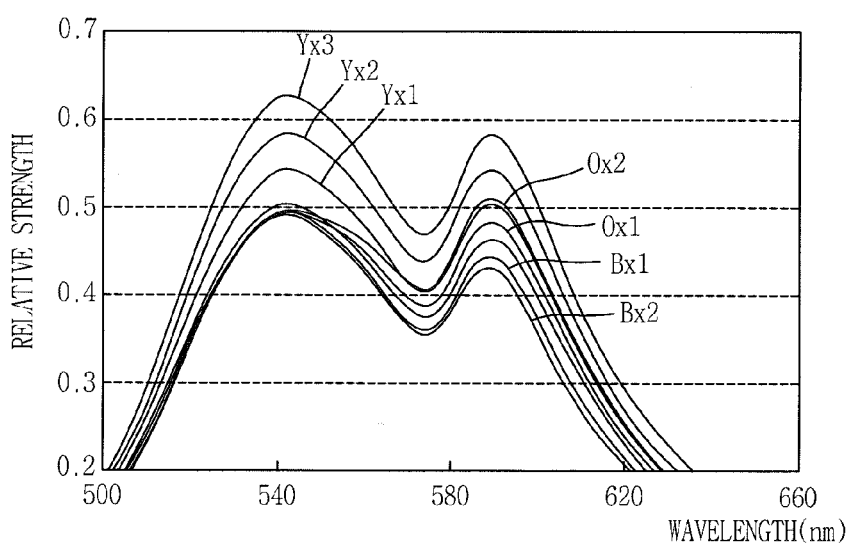
Figure 6:
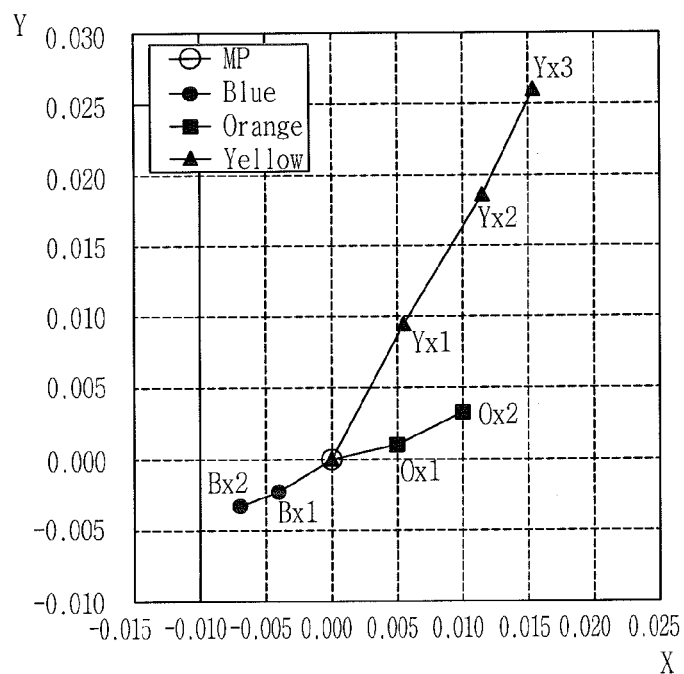
FIG. 6 is a graph showing a movement state of visible light in FIGS. 5a and 5b.
Figure 7:
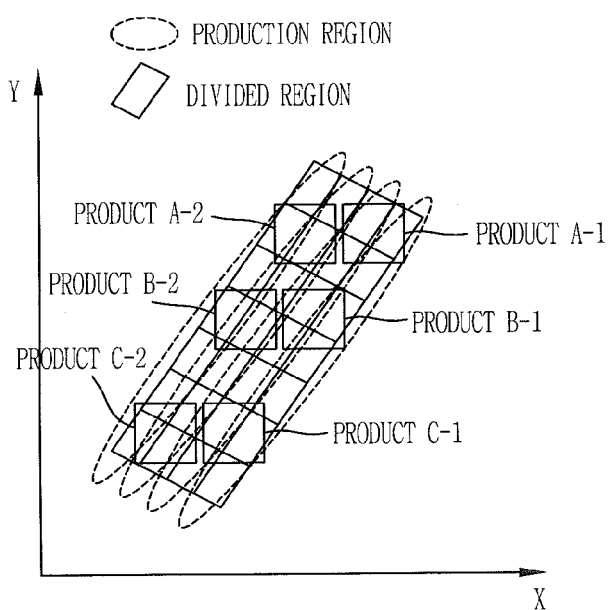
FIG. 7 is a graph showing a movement state of LED color regions of LCD products according to an embodiment of the present invention.

FIG. 5a is a graph of a spectrum distribution of a visible light wavelength region of the LCD device of FIG. 4, FIG. 5b is a graph of a spectrum distribution of a 500 nm~620 nm wavelength range of FIG. 5a, FIG. 6 is a graph showing a movement state of visible light in FIGS. 5a and 5b, and FIG. 7 is a graph showing a movement state of LED color regions of LCD products according to an embodiment of the present invention.

As shown in FIGS. 5a and 5b, regarding the LCD device according to the present invention, when white light provided from the backlight transmits through the light characteristics changing layer, light of a particular wavelength range transmits as it is with no change in the light characteristics, while light of the other remaining wavelength range is slightly shifted. Visible light each having a spectrum distribution is slightly shifted in a particular direction according to the density of the corresponding dye (or pigment). By adjusting such a color ratio, the overall color viewing sensation of the LCD device can be improved.

With reference to FIG. 6, the spectrum state appearing as having been shifted with respect to each of the yellow, blue and orange dyes will be described in detail. Based on an arbitrary particular point MP of the spectrum distribution in a particular LCD module of the related art, when the reference point is (0, 0) with respect to coordinates X and Y, it is noted that coordinate shifting occurs by the yellow dye at a first quadrant according to the density of the yellow dye and coordinate shifting occurs by the orange dye also at the first quadrant, and also it is noted that a conversion rate ($\Delta Y/\Delta X$) by the yellow dye generated at the first quadrant, namely, the inclination, is larger than the conversion rate by the orange dye. Meanwhile, coordinate shifting occurs at a third quadrant by the blue dye.

As a result, as shown in FIG. 7, regarding the available regions of the LEDs for LCD limited to the group of particular products (A, B and C), it is possible to fabricate a group of products (A1, A-2; B-1, B-2' C-1, C-2) each having a different chromaticity coordinates with respect to the group of particular products.

Therefore, although an LED is not within the chromaticity coordinates of a particular product, a color available region of a light source can be arbitrarily moved and selected within the available color range of the LED by properly adjusting the type and combination of dyes and pigments forming the light characteristics changing layer of the optical member, to thus restrain an increase in the unit cost of the general LED.

The light characteristics changing layer as described above may be form on any one of the optical members among the diffusion plate, the diffusion sheet, the prism sheet, the protection sheet, the reflection plate and the reflection sheet. In this case, the light characteristics changing layer formed on at least one of upper and lower surfaces of the optical member, and on the entire surface or on a portion of the surface.

Rather than the light characteristics changing member formed on one of the optical member, an additional one may be provided and formed by coating a dye and/or pigment of a color among yellow, blue, orange dyes and/or pigments on at least one of upper and lower surfaces of the base film made of PET and heat or UV curing the same.

The present invention is not limited to the direct type LCD device but can be applicable to the edge type LCD device. As the light source, any one of a cold cathode fluorescent lamp (CCFL), an external electrode fluorescent lamp (EEFL), and a hot cathode fluorescent lamp (HCFL) may be used.

As so far described, by having the optical member with the light characteristics changing layer formed through a relatively simple process compared with the related art, there is no need to use only an LED applied to a particular color region, so the fabrication cost of the LCD device can be reduced.

In addition, because light of the backlight is provided to the liquid crystal panel through the optical member having the light characteristics changing layer, the color viewing sensation of the LCD device can be improved. For example, if the LCD device needs to have a greenish color sensation, the optical characteristics changing layer can be adjusted to thereby easily obtain the desired color viewing sensation of the LCD device.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device comprising:
    a liquid crystal panel that displays an image;
    a backlight unit provided on a rear surface of the liquid crystal panel and providing light; and
    an optical member provided between the liquid crystal panel and the backlight unit and having a light characteristics changing layer for changing a spectrum distribution of light outputted from the backlight unit and chromaticity coordinates and providing the same to the liquid crystal panel, wherein the light characteristics changing layer is formed by coating a dye on the optical member, and the dye is a metal complex dye.

2. The device of claim 1, wherein the dye or the pigment has at least one of yellow, blue, orange colors.

3. The device of claim 1, wherein the light characteristics changing layer is formed on at least one surface of the optical member.

4. The device of claim 3, wherein the light characteristics changing layer is formed on the entirety or a portion of one surface of the optical member.

5. The device of claim 1, wherein the optical member is one of a diffusion plate, a diffusion sheet, a prism sheet, a protection sheet, a reflection plate and a reflection sheet.

6. A liquid crystal display device comprising:
    a liquid crystal panel that displays an image;
    a backlight unit provided on a rear surface of the liquid crystal panel and providing light; and
    an optical member provided between the liquid crystal panel and the backlight unit, including a diffusion plate, an optical sheet, and a reflection plate, and having a light characteristics changing layer for changing a spectrum distribution of light outputted from the backlight unit and chromaticity coordinates and providing the same to the liquid crystal panel~wherein the light characteristics changing layer is formed by coating a dye on the optical member, and the dye is a metal complex dye.

7. The device of claim 6, wherein the dye or the pigment has at least one of yellow, blue, orange colors.

8. The device of claim 6, wherein the light characteristics changing layer is formed on at least one surface of the optical member.

9. The device of claim 8, wherein the light characteristics changing layer is formed on the entirety or a portion of one surface of the optical member.

10. The device of claim 6, wherein the optical member is one of a diffusion plate, a diffusion sheet, a prism sheet, a protection sheet, a reflection plate and a reflection sheet.

* * * * *